United States Patent
Hao et al.

(10) Patent No.: US 9,113,229 B2
(45) Date of Patent: Aug. 18, 2015

(54) AUTOMATED CONTENT INGESTION

(71) Applicant: Verizon Patent and Licensing Inc., Basking Ridge, NJ (US)

(72) Inventors: Jianxiu Hao, Lexington, MA (US); Yuhui Qian, Lexington, MA (US); Zhiying Jin, Lexington, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 7 days.

(21) Appl. No.: 14/024,951

(22) Filed: Sep. 12, 2013

(65) Prior Publication Data

US 2015/0074706 A1 Mar. 12, 2015

(51) Int. Cl.
*H04N 7/173* (2011.01)
*H04N 21/81* (2011.01)
*H04N 21/262* (2011.01)

(52) U.S. Cl.
CPC ....... *H04N 21/812* (2013.01); *H04N 21/26258* (2013.01)

(58) Field of Classification Search
USPC .................. 725/24, 32, 64, 65, 114
See application file for complete search history.

(56) References Cited

U.S. PATENT DOCUMENTS

| | | | |
|---|---|---|---|
| 2007/0060346 A1* | 3/2007 | Edwards | 463/31 |
| 2010/0122174 A1* | 5/2010 | Snibbe et al. | 715/733 |
| 2012/0079577 A1* | 3/2012 | Hao et al. | 726/7 |
| 2013/0144984 A1* | 6/2013 | Zhao et al. | 709/219 |
| 2013/0159700 A1* | 6/2013 | Nakagawa et al. | 713/155 |
| 2014/0089989 A1* | 3/2014 | Farb et al. | 725/60 |
| 2014/0258449 A1* | 9/2014 | Holden et al. | 709/217 |

* cited by examiner

*Primary Examiner* — Nnenna Ekpo

(57) ABSTRACT

A method includes receiving, from a content provider, content for processing and information identifying at least one of advertisements or promotional material to include with the content. The method also includes processing the content into a number of different formats, inserting the advertisements or promotional material into the processed content. The method further includes providing an indication to the content provider that the content has been processed and receiving, from the content provider, an approval or disapproval of the processed content.

20 Claims, 8 Drawing Sheets

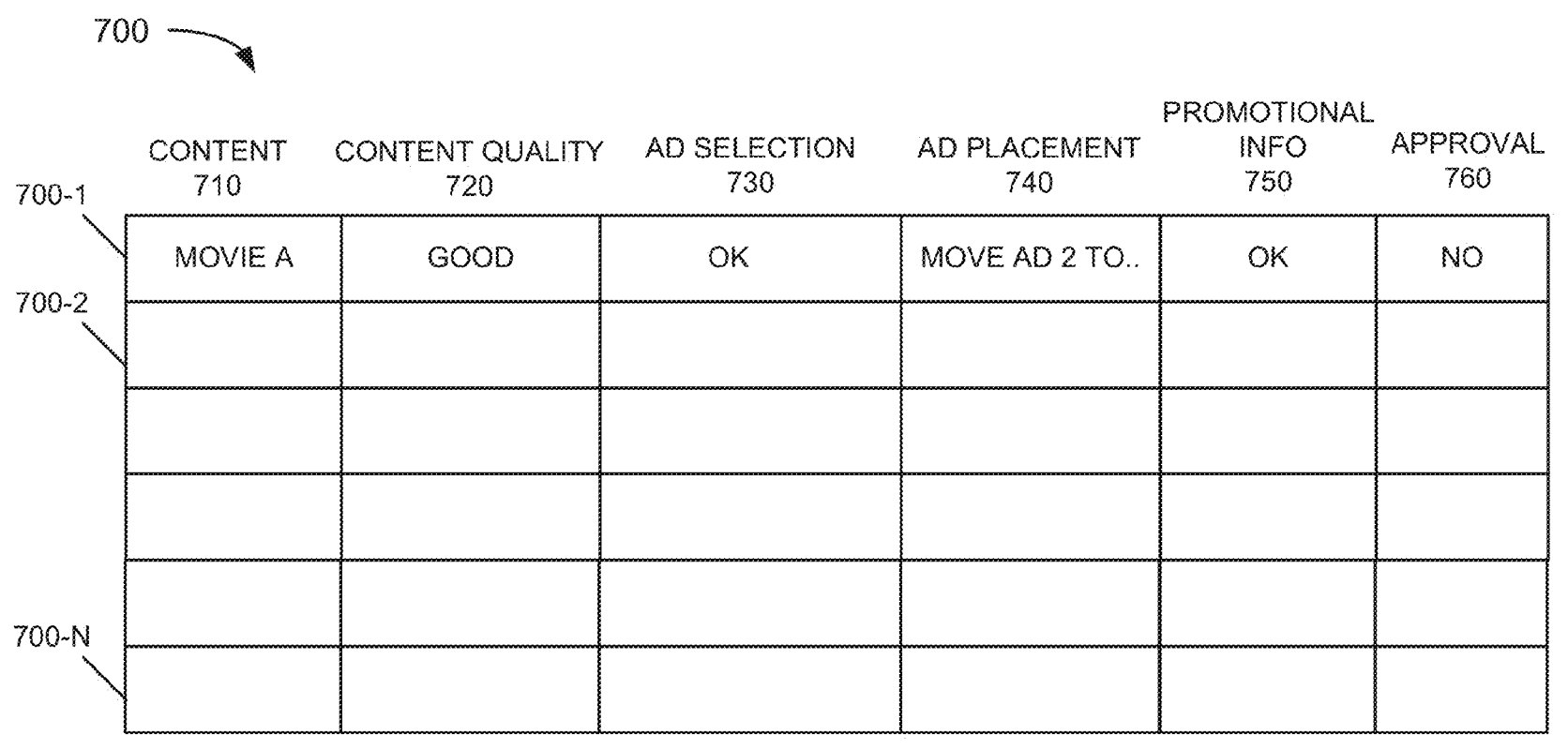

| CONTENT 710 | CONTENT QUALITY 720 | AD SELECTION 730 | AD PLACEMENT 740 | PROMOTIONAL INFO 750 | APPROVAL 760 |
|---|---|---|---|---|---|
| MOVIE A | GOOD | OK | MOVE AD 2 TO... | OK | NO |
| | | | | | |
| | | | | | |
| | | | | | |

FIG. 7

AUTOMATED CONTENT INGESTION

BACKGROUND INFORMATION

Consumer demand for media is increasing. For example, consumers often watch and/or listen to various media at home, while traveling, at work, etc. As a result, the number of content providers and the number of different types of devices for playing the content has also increased.

BRIEF DESCRIPTION OF THE DRAWINGS

FIG. 7 is a block diagram illustrating an exemplary user interface in connection with the processing of FIG. 6.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to a platform for distributing content to various consumer devices. In an exemplary implementation, a video content distribution platform allows a content provider to forward video content that will be automatically ingested and processed in accordance with various content provider requirements, as well as network related requirements and equipment related requirements associated with providing the processed content to the consumer devices. In one implementation, a content provider can also link or select advertisements and promotional material that will be included with the processed content. The platform also allows the content provider to test and verify the processed content via various client devices to ensure that the content meets the content provider's requirements.

Figure 1:
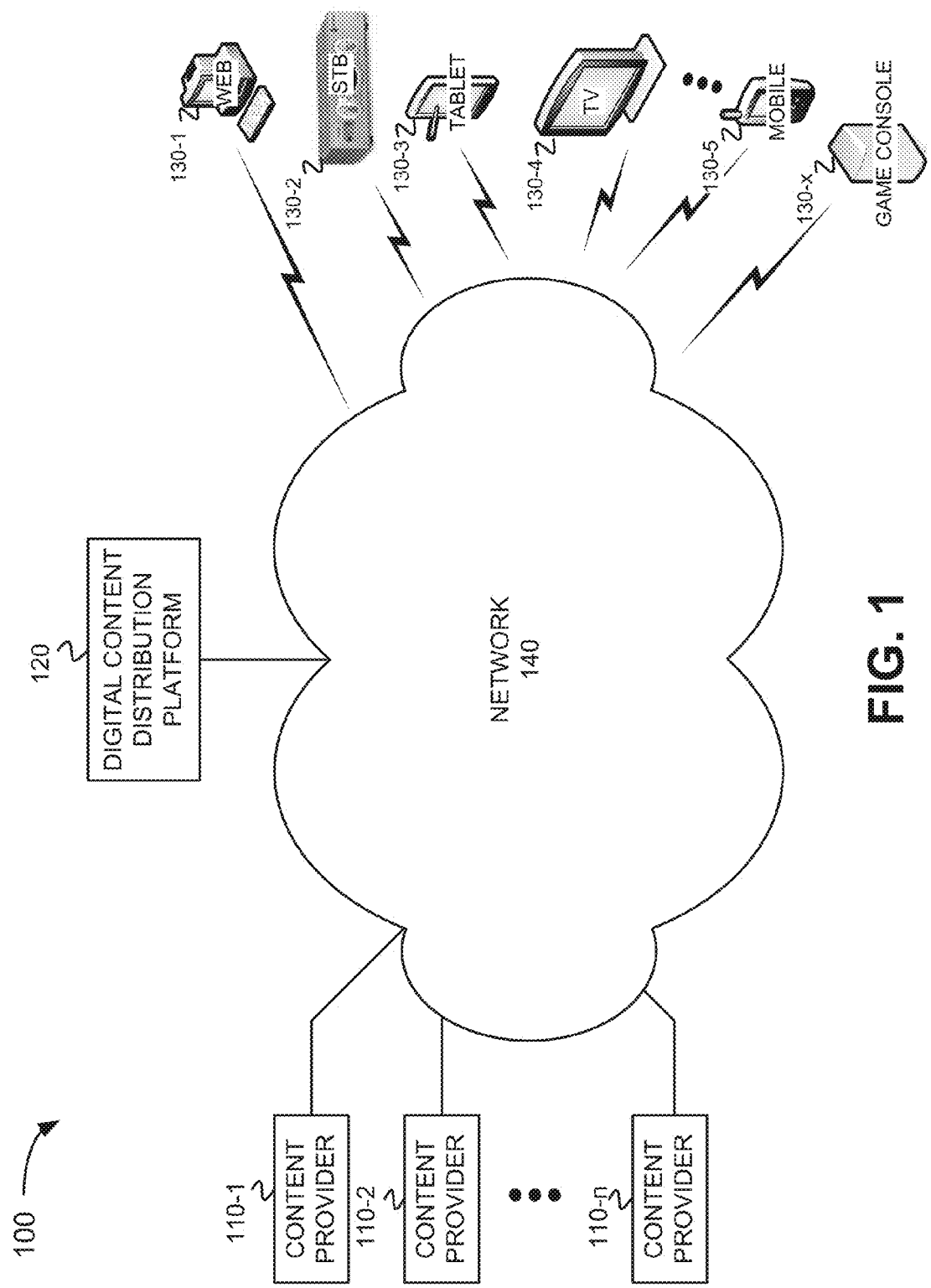
FIG. 1 illustrates an exemplary environment in which systems and methods described herein may be implemented.

FIG. 1 is a block diagram of an exemplary environment 100 in which systems and methods described herein may be implemented. Environment 100 may include content providers 110-1 through 110-n (referred to individually as content provider 110 or 110-x or collectively as content providers 110), digital content distribution platform (DCDP) 120, user devices 130-1 through 130-x (referred to collectively as user device 130 or 130-n or individually as user devices 130) and network 140.

Content providers 110-1 through 110-n may each include a processing device that stores digital content, and which may implement a user interface tool for uploading content or dropping content to DCDP 120.

DCDP 120 may include one or more computing devices, servers, etc., that perform various functions to assist in the provisioning (e.g., streaming, downloading, etc.) of content to user devices 130 via network 140. The term "content" or "digital content," as used herein, may include any type of media, such as video, audio, multi-media, textual data media, or unit of media that may be provided by DCDP 120 to user devices 130. The unit of content may include, for example, a segment of text, a defined set of graphics, a uniform resource locator (URL), a script, a program, an application or other unit of software, a media file (e.g., a movie, television content, music, video game, video clip, etc.), a document, or an interconnected sequence of files (e.g., HTTP Live Streaming (HLS) media files). The term "content," as used herein, may also be referred to herein as "assets" or "video assets."

Network 140 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 140 may include a content delivery network (not shown) having multiple nodes that allow the streaming of, or downloading of, digital content from DCDP 120 to user devices 130, as described below.

Each of user devices 130-1 through 130-x may include any type of computational device that may communicate with DCDP 120 and/or other devices, servers, etc., to receive digital content from DCDP 120. Each of customer devices 130 may include, for example, a computer (e.g., desktop, laptop, palmtop or tablet computer), a Personal Digital Assistant (PDA), a cellular telephone (e.g., a mobile smart phone), a Set-Top Box (STB), a game console, or a TV (e.g., a "smart TV").

The configuration of components of environment 100 shown in FIG. 1 is for illustrative purposes. Other configurations may be implemented. Therefore, environment 100 may include additional, fewer and/or different components, that may be configured in a different arrangement, than that depicted in FIG. 1.

Figure 2:
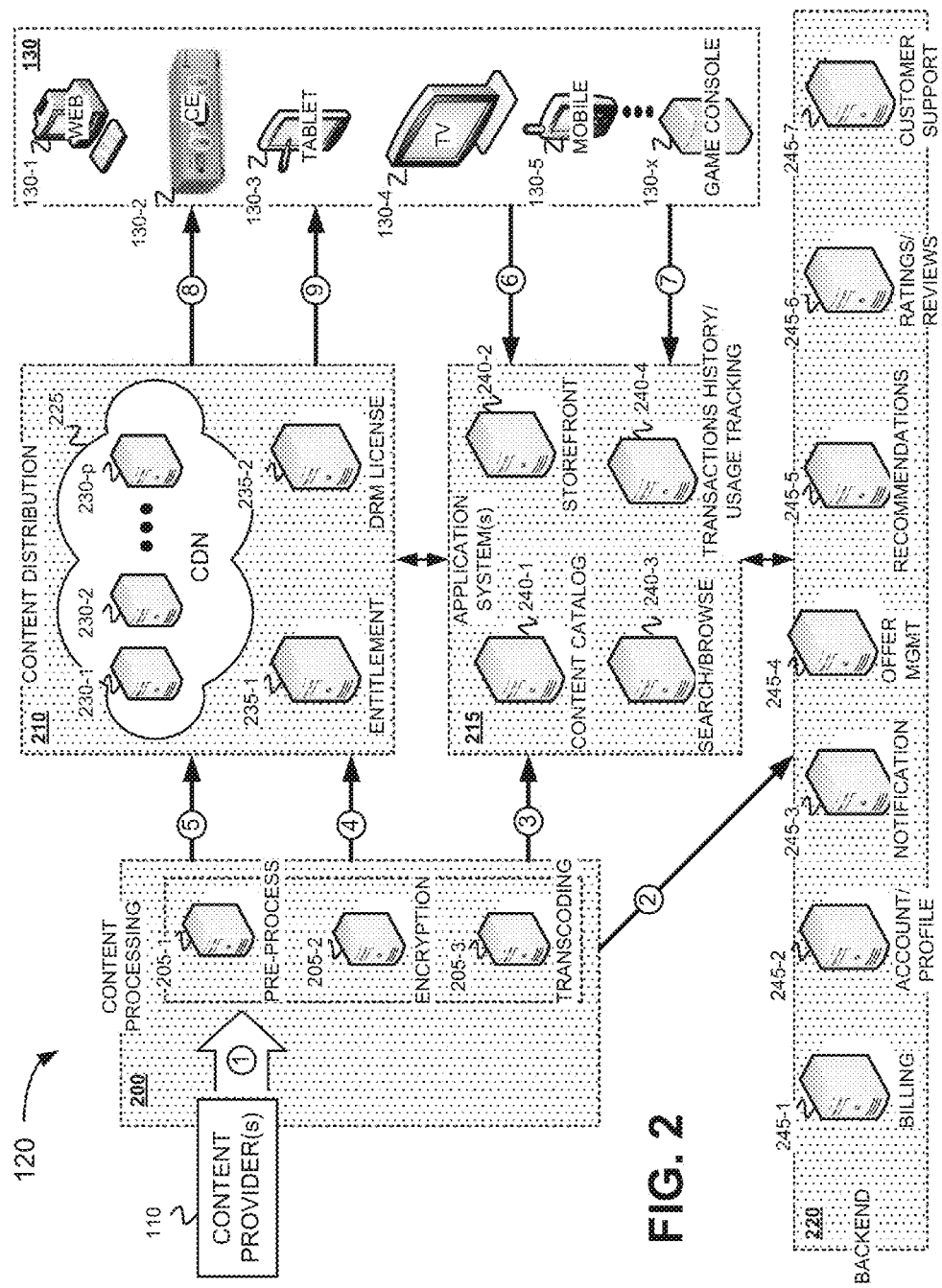
FIG. 2 illustrates an exemplary configuration of the digital content distribution platform of FIG. 1.

FIG. 2 illustrates components implemented in the DCDP 120 of FIG. 1 in accordance with an exemplary implementation. Referring to FIG. 2, DCDP 120 (the components of which are depicted in a shaded fashion in FIG. 2) includes content processing system 200, content distribution system 210, application systems 215, and backend systems 220.

Content processing system 200 may include a pre-processing device or server 205-1, an encryption device or server 205-2, and a transcoding device or server 205-3. Pre-processing device 205-1 may include a processing device that receives digital content from content provider(s) 110 (shown with a "1" within a circle) and converts the content into a standardized format. Encryption device 205-2 may include a processing device that applies digital rights management (DRM) rules to encrypt the digital content so that only authorized customers and devices can consume the content.

Transcoding device 205-3 may include a processing device that converts the digital content into proper formats for different types of consumer devices. The output file for the digital content can be one large file for downloading, or a series of segment files for streaming. The segment files may have different resolutions so that different bit rate streams can be delivered via the network bandwidth for smooth streaming. In an exemplary implementation, transcoding device 205-3 may convert the digital content received from content provider(s) 110 into HLS files or Smooth Streaming files. As depicted with a "2" within a circle in FIG. 2, content processing system 200 may send metadata associated with the digital content provided by content provider(s) 110 to backend systems 220. Additionally, content processing system 200 may send the metadata associated with the digital content provided by content provider(s) 110 and a content catalog (shown with a "3" within a circle) to application systems 215. The content catalog may include a complete library of digital content provided by content provider(s) 110, with associated data that can be used for searching the content catalog. As further depicted with a "4" within a circle, content processing system 200 may send encryption keys for digital content encrypted by encryption server(s) 205-2 to content distribution server(s). Content processing system 200 may additionally send encrypted digital content, encrypted using the encryption keys, to content distribution system 210, as shown with a "5" within a circle in FIG. 2.

Content distribution system 210 may include a content delivery network (CDN) 225, which further includes content delivery nodes 230-1 through 230-p, an entitlement device(s) or server 235-1 and a DRM license device or server 235-2. Content delivery nodes 230-1 through 230-p deliver digital content to user devices 130. The nodes of CDN 225 may be distributed geographically based on customer demand in different geographic regions. Entitlement server(s) 235-1 may include a network device that stores an entitlement database that contains the encrypted digital content received from content processing system 200, as an encrypted content catalog. The catalog may store and/or list content that is available for purchase, rental, subscription, and/or for trial usage. Entitlement server 235-1 associates the encrypted content catalog to a customer's profile to enforce what content the customer can consume, and on which device the customer may consume the content. Entitlement can be verified before a DRM license key can be issued to a user device 130. Entitlement may also be verified before application systems 215 issue a content download URI or URL to CDN 225 so that only entitled customers have access to encrypted content. The encrypted digital content may only be consumed by entitled customers on designated devices having DRM protections.

DRM license server(s) 235-2 may include a network device that interacts with content processing system 200 to ensure that digital content is encrypted according to DRM rules. DRM license server(s) 235-2 issues, validates, and enforces the DRM licenses to user devices 130. DRM license server(s) 235-2 distributes DRM license keys so that only those customers who are entitled to may consume the content on designated user devices 130 with DRM protections.

Application systems 215 may include a content catalog server(s) 240-1, a storefront server(s) 240-2, a search/browse server(s) 240-3, and a transactions history/usage tracking server(s) 240-4. Content catalog server(s) 240-1 may include a network device(s) that stores a unified unencrypted catalog of content that customers may browse and/or search to buy, rent or subscribe to content.

Storefront server(s) 240-2 may include a network device(s) that implements transaction management (e.g., a shopping cart), and the management of promotions and advertisements. Search/browse server(s) 240-3 may include a network device (s) that searches the unencrypted content stored in content catalog server(s) 240-1, and may locate relevant content based on, for example, one or more keywords. Search/browse server(s) 240-3 may also permit customers to browse the content stored in content catalog server(s) 240-1 via, for example, a hierarchical catalog structure (e.g., alphabetical by title, by date).

Transactions history/usage tracking server(s) 240-4 may include a network device(s) that tracks customers' usage of the content stored in content catalog server(s) 240-1, including customers' interactions with any of application systems 215, and the transactions in which the customers engage. Server(s) 240-4 may track and store transaction history information that details digital content viewed, rented and/or purchased for each customer.

Customers, at user devices 130, may, via search/browse server(s) 240-3, search and/or browse content in the content catalog stored by content catalog server 240-1, as shown with a "6" within a circle in FIG. 2. Upon selection of desired digital content, the customer at a user device 130, may log-in and purchase the selected digital content, as shown with a "7" within a circle in FIG. 2. Customers, at user device 130, may initially be notified of the presence of digital content currently being offered via notification server(s) 245-3 of backend system(s) 220.

Backend systems 220 may include one or more devices, servers, etc., for performing backend functions. Backend systems 220 may include a billing device or server(s) 245-1, an account/profile device or server(s) 245-2, a notification device or server(s) 245-3, an offer management device or server(s) 245-4, a recommendations device or server(s) 245-5, a ratings/reviews device or server(s) 245-6 and a customer support device or server(s) 245-7.

Billing server(s) 245-1 may include a network device(s) that processes rental and purchase transactions of content from DCDP 120 by customers at user devices 130. Billing server(s) 245-1 may also process content catalog subscriptions that enable customers at user devices 130 to access content stored at DCDP 120. The subscriptions may be billed, for example, automatically each month. Billing server(s) 245-1 may act in conjunction with entitlement server(s) 235-1 to determine which customers are entitled to access content at designated different ones of user devices 130.

Account/profile server(s) 245-2 may include a network device(s) that maintains account information associated with customers at user devices 130, including log-in credentials used for validating log-ins of customers. The account information may include, for example, contact names, email addresses, mailing addresses, billing information, authorized device information, entitlement rights of content, and customer profiles (e.g., customer preferences). Notification server(s) 245-3 may include a network device(s) that provides electronic notifications to customers regarding content stored in the content catalog. The electronic notifications may include, for example, email notifications, system notifications (e.g., pop-up displays upon customer log-in), Instant Messaging (IM) notifications, or social network notifications.

Offer management server(s) 245-4 may include a network device(s) that generates offers related to customer purchase or rental of digital content, and/or offers related to digital content trial usage. Server(s) 245-4 may additionally obtain or generate promotions and/or advertisements for including with the content. Recommendations server(s) 245-5 may include a network device(s) that recommends content to a searching or browsing customer based on, for example, the customer's profile (e.g., customer preferences), content usage history, or content transaction history.

Ratings/reviews server(s) 245-6 may include a network device(s) that receives, stores and tabulates customer ratings, feedback, and/or reviews associated with digital content stored in the content catalog, or associated with promotions or advertisements provided in conjunction with the digital content. Customer support server(s) 245-7 may include a network device(s) that provides a handles customer service-related feedback, customer questions, or credit related customer questions or requests.

The configuration of components of DCDP 120 shown in FIG. 2 is for illustrative purposes. Other configurations may be implemented. Therefore, DCDP 120 of FIG. 2 may include additional, fewer and/or different servers that may be configured in a different arrangement than that depicted in FIG. 2. In addition, in alternative implementations, functions described as being performed by one device may be performed by another device or combination of devices.

Figure 3:
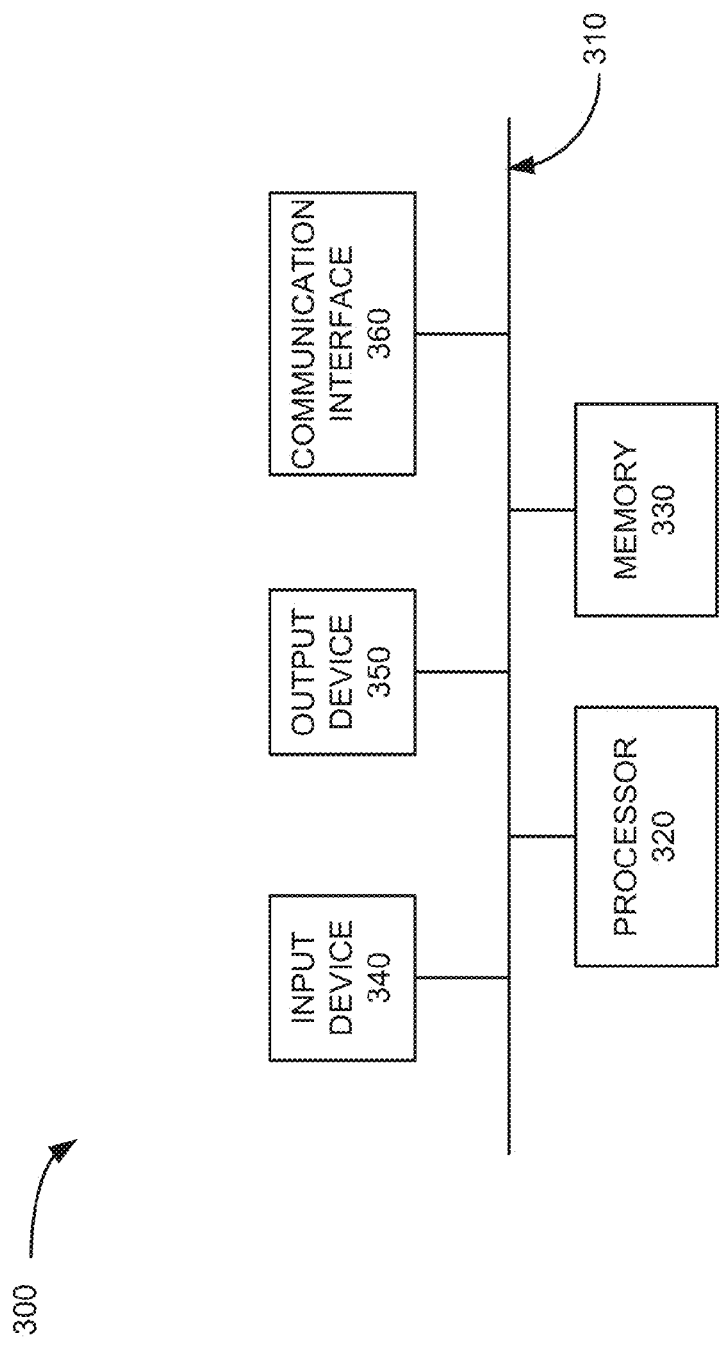
FIG. 3 illustrates an exemplary configuration of components implemented in one or more of the devices of FIG. 2.

FIG. 3 illustrates an exemplary configuration of a device 300. Device 300 may correspond to any of the components/devices illustrated in FIG. 2. Referring to FIG. 3, device 300 includes bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to device 300, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD), a printer, a speaker, etc.).

Communication interface 360 may include a transceiver that device 300 uses to communicate with other devices via wired, wireless or optical mechanisms. Communication interface 360 may also include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network, such as network 140 or another network.

The exemplary configuration illustrated in FIG. 3 is provided for simplicity. It should be understood that device 300 may include more or fewer devices than illustrated in FIG. 3. In an exemplary implementation, device 300 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

As described above, DCDP 120 provides a platform for content providers 110 to provide content that will be ingested or processed by content processing system 200. In an exemplary implementation, content processing system 200 may allow content providers 110 to drop "raw" video content, which will be automatically ingested and processed in accordance with various criteria.

Figure 4:
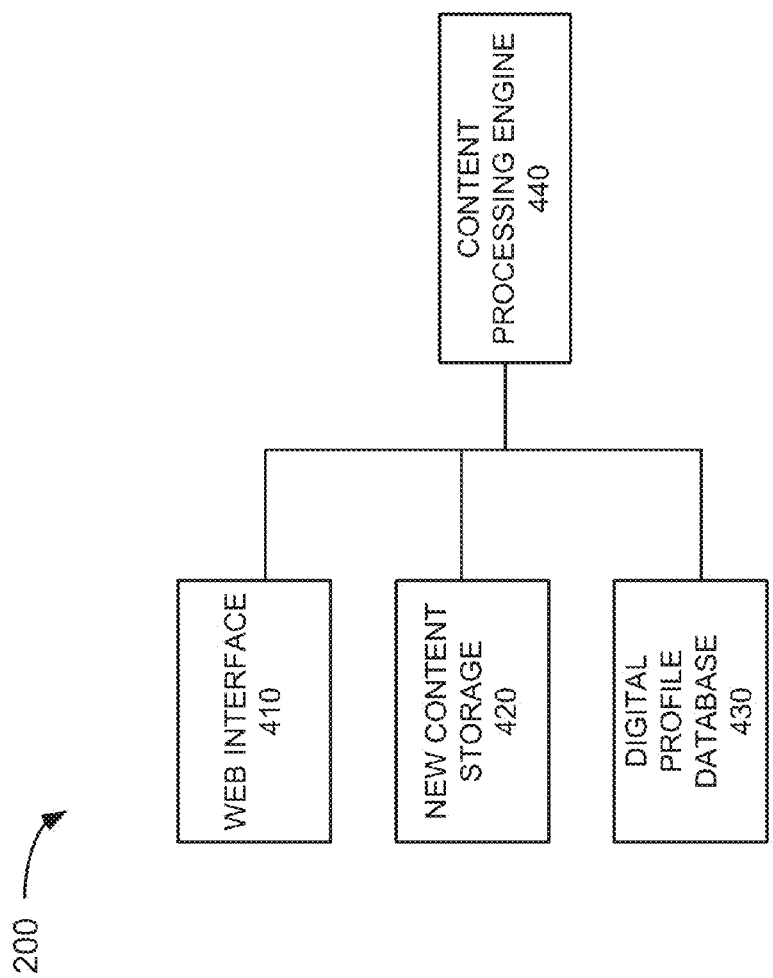
FIG. 4 illustrates exemplary logic components implemented in the content processing system of FIG. 2.

FIG. 4 illustrates components implemented in content processing system 200 in accordance with an exemplary implementation. Referring to FIG. 4, content processing system 200 includes web interface 410, new content storage 420, digital profile database 430 and content processing engine 440. In one implementation, the logic components illustrated in FIG. 4 may be implemented via pre-processing device 205-1. In other implementations, the logic components illustrated in FIG. 4 may be implemented via other devices/systems.

Web interface 410 includes logic to allow content providers 110 to upload or drop video content (e.g., raw video content) for processing by DCDP 120. For example, web interface 410 may act as the input portal for content providers 110 to interact with DCDP 120. In addition, web interface 410 may provide a portal to allow content providers 110 to retrieve, review, test and/or approve content processed by DCDP 120, as described in detail below.

New content storage 420 may represent one or more storage devices or locations (e.g., file folders, databases, etc.) in which new content for processing by DCDP 120 is initially stored. For example, new content storage 420 may act as a "hot folder" in which new content supplied by content providers 110 is stored.

Digital profile database 430 may store digital profiles associated with a number of different digital formats and/or types of user devices. For example, digital profile database 430 may identify several different media resolutions for different bit rates to accommodate bandwidth limitations for various transport networks. As an example, digital profile database 430 may store information indicating that HLS format is to be used for video to be distributed to mobile phones, tablets, various smart TVs, etc. Digital profile database 430 may also store information indicating that Smooth Streaming format should be used for video distributed to some customer electronic devices, such as various game consoles (e.g., Xbox, PS3, Wii, etc.). Digital profile database 430 may further store information indicating that Smooth Streaming format should be used for streaming content to consumer devices via Web browsers.

Content processing engine 440 includes logic to initiate and/or control the processing of new content provided by content providers 110. For example, content processing engine 440 may access new content storage 420 on a periodic basis to identify the presence of new content. Alternatively, when new content is received, web interface 410 may signal content processing engine 440 of the presence of new content. In an exemplary implementation, content provided by content providers 110 may include an Entertainment Identifier Registry (EIDR) identifier (ID) that provides a unique identifier for a particular asset, such as a movie, a television program or other audio-visual object. Content processing engine 440 may use the EIDR ID, or other identifier, to facilitate processing of the content. In addition, content provided by content providers 110 may include metadata with the content. For example, content may include metadata identifying the title, actors, a brief description of the content, duration, rating, etc. Content processing engine 440 may process the metadata to normalize the metadata, as described in detail below.

Figure 5:
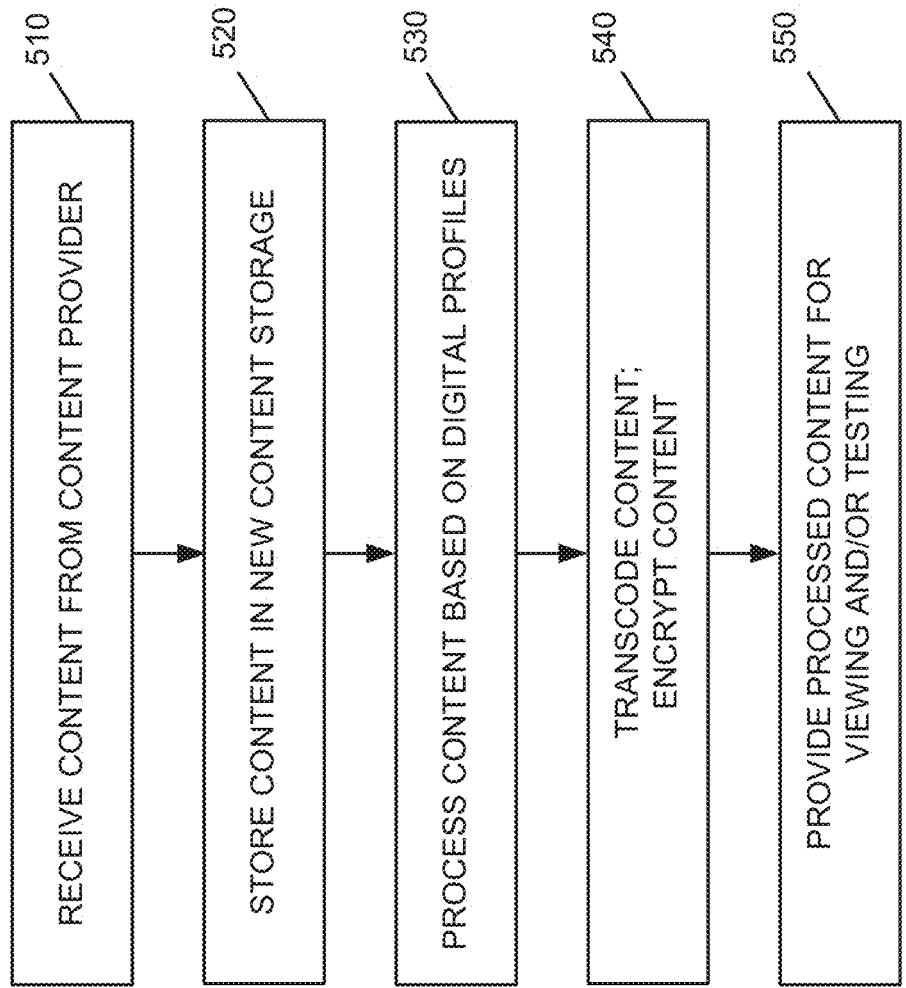
FIG. 5 is a flow diagram illustrating processing associated with ingesting and processing content by the devices of FIG. 2 in accordance with an exemplary implementation.

FIG. 5 illustrates exemplary processing associated with receiving and processing content in environment 100. Processing may begin with a content provider 110 uploading or forwarding content to DCDP 120. For example, personnel at content provider 110 may access web interface 410 and forward content, such as a movie, a television program, etc., to content processing system 200. In an exemplary implementation, content provider 110 may forward the content via file transfer protocol (FTP) or via another protocol.

Content processing system 200 receives the content (block 510). Web interface 410 may automatically forward the content to new content storage 420 for storage (block 520). The new content may include an EIDR ID or other unique ID that identifies the content. Web interface 410 and/or content processing engine 440 may store the new content and use the EIDR ID, or other identifier, as an index to facilitate later retrieval of the new content.

Content processing engine 440 may also periodically access new content storage 420 to identify new content for further processing. For example, content processing engine 440 may access a "hot" folder associated with new content storage 420 in which recently received content has been stored. Content processing engine 440 may then begin processing the content based on digital profiles stored in digital profile database 430 (block 530). For example, content processing engine 440 may access digital profile database 430 and identify various types of user devices (e.g., user devices 130), such as mobile devices, tablets, smart TVs, game consoles, personal computers, laptops, etc., via which a particular content provider 110 would like their content to be viewed.

As an example, content provider 110-1 may specify content that it provided to DCDP 120 to be processed for viewing via mobile devices (e.g., smart phones), smart TVs, game consoles, tablet computers and personal computers. In some instances, content provider 110-1 may have previously communicated its requirements regarding types of user devices via which it would like its content to be viewed, as well as various requirements associated with the quality of the content (e.g., high-definition, standard definition, etc.). In such instances, content processing engine 440 may identify the appropriate stored profile for content provider 110-1 in digital profile database 430 and forward the content to pre-processing device 205-1, along with information regarding the type of processing for the received content. As described above, pre-processing device 205-1 may convert the content into a standardized format associated with the particular digital profiles of the user devices which will be used to view the content.

After the content has been processed by pre-processing device 205-1, the content may be transcoded (block 540). For example, transcoding device 205-3 converts the digital content into proper formats for different types of consumer devices (e.g., user devices 130) and into a variety of different formats and resolutions. For example, transcoding device 205-3 may convert the content into files having different resolutions (e.g., high definition, standard definition) based on bandwidth or bit rate limitations associated with different networks that may be used to transport the content to user devices 130. The output file for the digital content can be one large file for downloading, or a series of segment files for streaming. The segment files may have different resolutions so that different bit rate streams can be delivered based on the network bandwidth for smooth streaming.

After the content has been transcoded, the content may be encrypted (block 540). For example, the content may be encrypted using different DRMs in accordance with information stored in digital profile database 430. As an example, one content provider 110 may request that the content be encrypted using Microsoft Playready (PR) DRM, while another content provider 110 may request that the content be encrypted using Motorola Secure Media (SM) DRM or Google Widevine DRM. In other cases, a service provider associated with DCDP 120 may encrypt the content in accordance with requirements associated with various end user devices. In each case, the content may be encrypted in accordance with the particular requirements provided by content provider 110, requirements associated with DCDP 120 and/or requirements associated with user devices 130.

After encryption, content processing engine 440 may signal content provider 110 that the content has been processed and is available for testing and/or viewing by content provider 110 (block 550). For example, content processing engine 440 may forward a communication, such as an email, text message or another type of communication, via web interface 410 indicating that the content is ready for viewing and/or testing. Alternatively, content processing engine 440 may forward a message at the time the content was provided by content provider 110 with a time estimating when the content will be ready for viewing. The estimated completion time may be based on the amount of processing associated with the particular content and/or the amount of other content from other content providers 110s awaiting processing. In each case, content provider 110 may retrieve the content for viewing and testing, as described in detail below.

Figure 6:
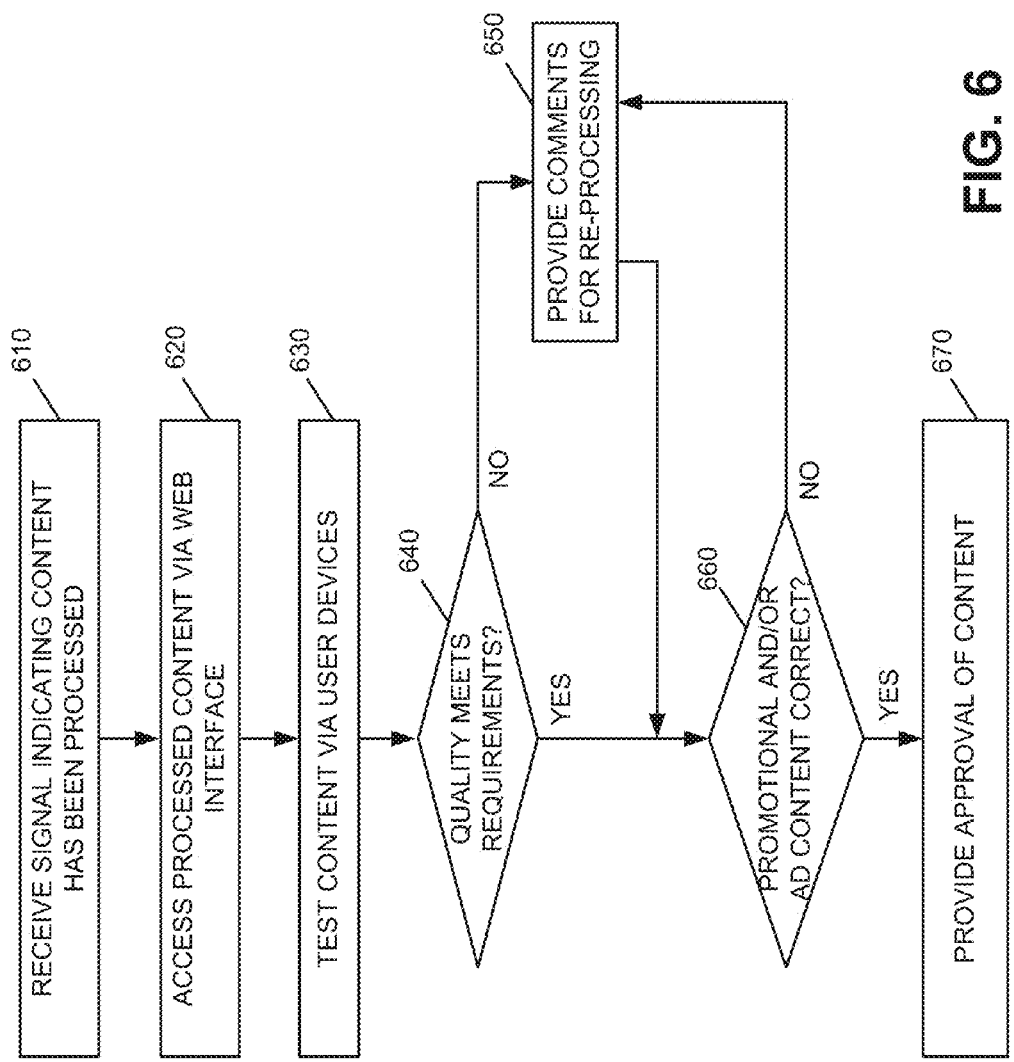
FIG. 6 is a flow diagram illustrating processing associated with testing content processed by the components of FIG. 2 in accordance with an exemplary implementation.

FIG. 6 illustrates exemplary processing associated with a content provider 110 viewing and/or testing processed content. Processing may begin with content provider 110-1 receiving a communication via web interface 410 indicating that the content has been processed (block 610).

Content provider 110-1 may then access the identified content (block 620). For example, content provider 110-1 may access web interface 410 to retrieve the content. Web interface 410 may provide a graphical user interface (GUI) via which content providers 110 log in to access processed content. For example, content provider 110-1 may provide a user ID and password in response to a request provided by the GUI. In response to receiving a valid ID and password, the GUI provided by web interface 410 may provide a listing of contents associated with content provider 110-1 that has been processed by DCDP 120. The content may be listed by title, EIDR ID, or another identifier.

Assume that content provider 110-1 accesses a particular movie that has been processed by DCDP 120. Personnel at content provider 110-1 may then test the processed content via various client/user devices (block 630). For example, content provider 110 may view the processed content via a personal computer or tablet to which the content is streamed, via a mobile phone, a gaming system, a smart TV, etc. In each case, personnel at content provider 110-1 may determine whether the quality of the content meets the content provider 110-1's requirements (block 640). If the quality does not meet content provider's 110 requirements (block 640—no), content provider 110 may provide comments to DCDP 120 via the GUI provided by web interface 410 (block 650).

For example, FIG. 7 illustrates an exemplary GUI 700 via which a content provider may provide comments regarding the processed content. Referring to FIG. 7, GUI 700 includes content field 710, content quality field 720, ad selection field 730, ad placement field 740, promotional information field 750 and approval field 760. In other implementations, GUI 700 may include other fields. Each entry in GUI 700, such as entry 700-1 may represent content (i.e., Movie A in this example) processed by DCDP 120, that is ready for review. After viewing Movie A identified in content field 710 of entry

720-1, personnel at content provider 110 may provide comments in content quality field 720 indicating whether the quality of the content meets content provider 110's requirements. In some implementations, personnel at content provider 110 may enter "good," "acceptable," "unacceptable" in content field 720. In other implementations, content quality field 720 may include a drop down menu that facilitates entry of information that can be automatically processed by DCDP 120.

Content provider 110-1 may also view the content on multiple client devices corresponding to different types of user devices 130. For example, content provider 110-1 may view the content on a smart phone, via a game console, on a table computer, etc. For each client device, content provider 110-1 may provide comments regarding the processed content via content quality field 720. For example, content quality field 720-1 may include a drop down menu that allows content providers to select the particular type of client/user device associated with the comments.

DCDP 120 may receive the comments and personnel at DCDP 120 may re-ingest or re-process the content based on the comments/problems provided in content quality field 720. In some implementations, the comments provided in content quality field 720 may allow content processing system 200 to automatically re-ingest the content to make changes based on content provider 110's comments, as described in detail below.

Content provider 110 may also determine whether the proper advertisements and/or promotional materials have been provided in the processed content (block 660). For example, content provider 110 may have provided certain promotional material or links to the promotional material that are to be included with the content. For example, the promotional material may indicate that the viewer can view two movies from content provider 110-1 over the next week at discounted price. If the promotional material is not present or has been inserted in the wrong place within the processed content, content provider 110 may provide comments via GUI 700 (block 650). For example, personnel at content provider 110 may provide comments in promotional information field 750 indicating that the promotional material is correct or is not correct. For example, content provider 110-1 may indicate that the promotional material is correct, as indicated in field 750 of entry 700-1. If content provider 110-1 would like to move the promotional material, content provider 110 may provide comments in field 750 regarding the preferred placement of the promotional material.

Similarly, content provider 110 may indicate whether the correct advertisements are included via ad selection field 730 and whether the location of the advertisements is correct via ad placement field 740 (block 660). For example, content provider 110 may have selected various ads and/or provided links to various ads to be included with the content. If the advertising material is not present or has been inserted in the wrong place within the processed content (block 660—no), content provider 110 may provide comments via fields 730 and 740 of GUI 700 (block 650). For example, personnel at content provider 110 may provide comments in ad selection field 730 indicating that the ad selection is correct/OK, as indicated in field 730 of entry 720-1. However, personnel at content provider 110 may provide comments in field 740 indicating that one of the ads should be moved, as illustrated in field 740 in entry 700-1. For example, personnel may enter information indicating that the second ad provided in Movie A should be moved to a different location within the processed content, as illustrated in field 740 in entry 700-1. In some implementations, GUI 700 includes drop down menus associated with ad placement field 740 to allow personnel from content provider 110-1 to enter a particular location, such as a time from the start of Movie A, at which content provider 110-1 would like to move a certain advertisement. For example, content provider 110-1 may wish to move a car commercial located prior to the start of Movie A to the point in the movie after a car chase has occurred.

If the quality of the processed content meets content provider 110-1's requirements, and the ads and promotional material are correct, content provider 110-1 may provide approval of the content via approval field 760. In each case, GUI 700 may facilitate the providing of comments so that DCDP 120 can easily re-ingest the content for re-processing. For example, as discussed above, in some implementations, DCDP 120 may automatically re-ingest the processed content and make the changes indicated in fields 720-750. As an example, if information in approval field 760 indicates that approval has not been provided (e.g., field 760 indicates "no"), DCDP 120 may automatically re-process the content to make the changes noted in fields 720-750. That is, content processing system 200 may identify the changes stored in fields 720-750 and automatically re-process the content to make the requested changes. In other instances, personnel at DCDP 120 may review the comments provided in fields 720-750 and initiate re-processing of the content. In either case, GUI 700 provides a simple interface to allow content providers 110 to review content and provide feedback to DCDP 120 for further processing, if necessary.

As described above with respect to FIG. 2, in some implementations, content processing system 200 may send metadata associated with the digital content provided by content provider 110 to application systems 215 and backend systems 220. In an exemplary implementation, DCDP 120 may also modify the metadata to create a "normalized" metadata, as described in detail below.

Figure 8:
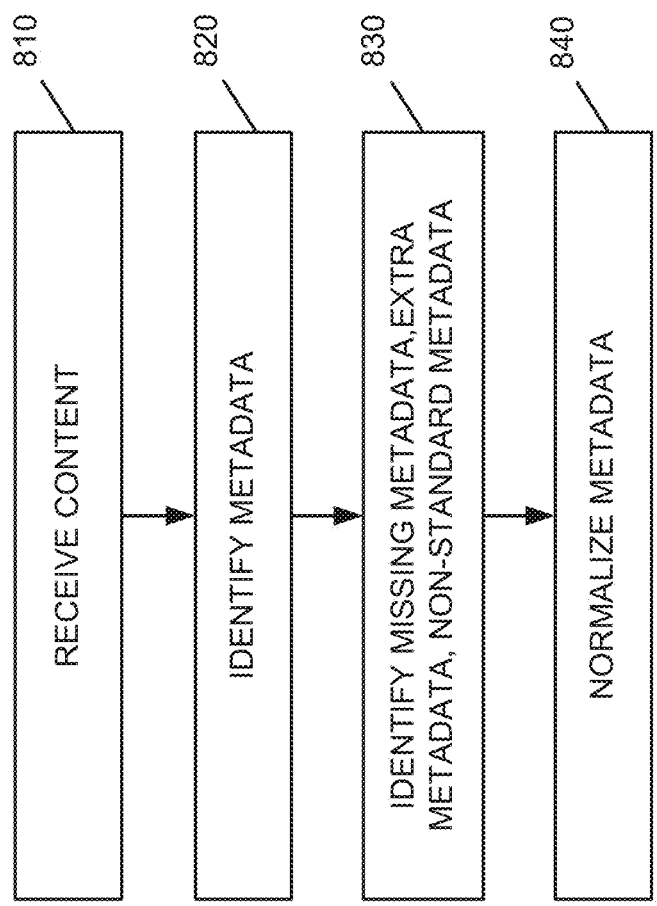
FIG. 8 is a flow diagram illustrating processing associated with normalizing metadata in accordance with an exemplary implementation.

FIG. 8 illustrates exemplary processing associated with processing metadata. Processing may begin with DCDP 120 receiving content from content providers 110 (block 810). As described above, digital content provided by content providers 110 may include metadata in various different formats. Pre-processing device 205-1 may identify the metadata within the content (block 820).

Pre-processing device 205-1 may also determine whether any metadata associated with the standardized format used by the service provider associated with DCDP 120 is missing, whether the received metadata includes extra metadata not used by the service provider associated with DCDP 120, whether non-standard metadata (e.g., metadata that includes too many characters, such as description metadata that exceeds a predetermined character limit) is included with the metadata, etc. (block 830).

For example, DCDP 120 (or a service provider using DCDP 120 to process and distribute content) may use a standardized format for metadata, such as metadata that includes the title, main actors, rating, genre, brief description and duration. If the received metadata does not include one or more of the appropriate metadata fields, pre-processing engine 205-1 may use the EIDR ID or other unique identifier of the content to obtain the missing information. For example, pre-processing device 205-1 may access a database of metadata stored in content catalog server 240-1 to obtain the needed metadata. If the needed metadata is not available in content catalog server 240-1, pre-processing device 205-1 may obtain the needed metadata via a search of other databases accessible via, for example, network 140.

Alternatively, if the metadata includes extra data/fields, pre-processing device 205-1 may delete the extraneous information. Still further, if one of the fields, such as the description field is too long, pre-processing device 205-1 may truncate or shorten the description.

In each case, DCPD 120 effectively normalizes or standardizes the metadata based on the particular requirements of a service provider associated with ingesting content and distributing content via DCDP 120.

Implementations described herein provide a platform for distributing content to various consumer devices. In one implementation, the video content distribution platform allows a content provider to forward raw video content that will be automatically ingested and processed in accordance with various content provider requirements, as well as network related requirements and equipment related requirements. When the content has been processed, the platform automatically informs the content provider that the content is ready for viewing and testing.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, DCDP 120 was described as being associated with a particular service provider that distributes content to user devices, such as subscribers. In other implementations, DCDP 120 may be used by various different service providers to process content for distribution to end users or subscribers.

In addition, in implementations have been described above as allowing content providers to select ads or promotional material to include with the content. In other implementations, DCDP 120 may automatically provide promotional material and/or advertisements. For example, DCDP 120 may insert promotional material and/or advertisements based on the metadata included in the content. As an example, a promotion for a second movie of a similar genre may be provided at the end of the movie currently being viewed and may include a discount price to watch the second movie. As another example, ads that will more likely appeal to the viewer may be provided based on the metadata and/or the ads may be automatically moved to different portions of the content based on the content.

In addition, implementations have been described above with respect to testing video content that is to be distributed to end users. In other implementations, DCDP 120 may be used to distribute other types of content, such as audio, text (e.g., electronic books streamed to a user), etc.

Further, implementations have been described above with respect to different content providers 110 providing content to DCDP 120. The content providers 110 may range from large production companies, movie studios, etc., to individuals or small companies producing a single video/content for processing. In each case, DCDP 120 processes the content in accordance with the particular content provider 110's requirements.

Still further, while series of acts have been described with respect to FIGS. 5, 6 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, from a content provider, content for processing;
   receiving, from the content provider, information identifying at least one of advertisements or promotional material to include with the content;
   processing, by a content processing system, the content into a plurality of different formats;
   inserting, by the content processing system, the at least one of advertisements or promotional material into the processed content;
   providing, by the content processing system, an indication to the content provider that the content has been processed;
   providing, to the content provider, a graphical user interface (GUI), wherein the GUI includes options to allow the content provider to provide at least one of: comments identifying changes to be made to the processed content, or an approval or disapproval of the processed content; and
   receiving, from the content provider and via the GUI, at least one of comments identifying changes to be made to the processed content, the approval of the processed content or the disapproval of the processed content.

2. The computer-implemented method of claim 1, further comprising:
   receiving, from the content provider and via the GUI, information indicating that at least some of the content is missing from the processed content.

3. The computer-implemented method of claim 1, further comprising:
   receiving, from the content provider and via the GUI, second information indicating that at least some of the advertisements or promotional material are not included in the processed content or need to be moved to a different portion of the processed content.

4. The computer-implemented method of claim 3, further comprising:
   automatically re-processing the content based on the received second information.

5. The computer-implemented method of claim 1, wherein the GUI includes drop down menus comprising selections for indicating at least one of changes to be made or problems with the processed content.

6. The computer-implemented method of claim 1, further comprising:
   identifying metadata associated with the received content; and
   determining whether the identified metadata conforms to a standardized metadata format associated with an entity processing the content.

7. The computer-implemented method of claim 6, further comprising:
   at least one of modifying the metadata or obtaining additional metadata to conform to the standardized metadata format, in response to determining that the identified metadata does not conform to the standardized metadata format.

8. The computer-implemented method of claim 7, wherein the at least one of modifying the metadata or obtaining additional metadata comprises:
   obtaining additional metadata, and
   wherein the obtaining additional metadata comprises:
      using an entertainment identifier registry (EIDR) identifier to obtain the additional metadata, the method further comprising:
         inserting the additional metadata with the identified metadata.

9. A system, comprising:
   at least one processing device configured to:
      receive, from a content provider, content for processing,
      receive, from the content provider, information identifying at least one of advertisements or promotional material to include with the content,
      process the content into a plurality of different formats,
      insert the at least one of advertisements or promotional material into the processed content,
      provide an indication to the content provider that the content has been processed,
      provide, to the content provider, a graphical user interface (GUI), wherein the GUI presents options to allow the content provider to provide at least one of: comments identifying changes to be made to the processed content, an approval of the processed content or a disapproval of the processed content,
      receive, from the content provider and via the GUI, at least one of comments regarding the processed content, the approval of the processed content or the disapproval of the processed content.

10. The system of claim 9, wherein the at least one processing device is further configured to:
    receive, from the content provider and via the GUI, information indicating that at least some of the content is missing from the processed content.

11. The system of claim 9, wherein the at least one processing device is further configured to:
    receive, from the content provider, second information indicating that at least some of the advertisements or promotional material are not included in the processed content or need to be moved to a different portion of the processed content.

12. The system of claim 11, wherein the at least one processing device is further configured to:
    automatically re-process the content based on the received second information.

13. The system of claim 9, wherein the GUI includes drop down menus comprising selections for indicating at least one of changes to be made or problems with the processed content.

14. The system of claim 9, wherein the at least one processing device is further configured to:
    identify metadata associated with the received content; and
    determine whether the identified metadata conforms to a standardized metadata format associated with the system.

15. The system of claim 14, wherein the at least one processing device is further configured to:
    at least one of modify the metadata or obtain additional metadata to conform to the standardized metadata format, in response to determining that the identified metadata does not conform to the standardized metadata format.

16. The system of claim 15, wherein the at least one of modifying the metadata or obtaining additional metadata comprises:
    obtaining additional metadata, and
    wherein when obtaining additional metadata, the at least one processing device is configured to:
       use an entertainment identifier registry (EIDR) identifier to obtain the additional metadata, and wherein the at least one processing device is further configured to:
          merge the additional metadata with the identified metadata.

17. A computer-implemented method, comprising:
    receiving, from a content provider, content for processing;
    processing, by a content processing system, the content into a plurality of different formats;
    inserting, by the content processing system, at least one of advertisements or promotional material into the processed content;
    providing, by the content processing system, an indication to the content provider that the content has been processed; and
    providing, to the content provider, a graphical user interface (GUI), wherein the GUI includes options to allow the content provider to at least one of provide comments identifying changes to be made to the processed content, provide an approval of the processed content or provide a disapproval of the processed content.

18. The computer-implemented method of claim 17, further comprising:
    receiving, from the content provider, comments identifying changes to be made to the processed content; and
    automatically re-processing the content based on the received comments.

19. The computer-implemented method of claim 1, wherein the GUI includes options to allow the content provider to:
    provide comments identifying changes to be made to the processed content, and
    provide the approval or disapproval of the processed content.

20. The computer-implemented method of claim 17, wherein the GUI includes options to allow the content provider to:
    provide comments identifying changes to be made to the processed content, and
    provide the approval of the processed content or the disapproval of the processed content.

* * * * *